US00RE48396E

(19) United States
(12) Reissued Patent
Ma et al.

(10) Patent Number: US RE48,396 E
(45) Date of Reissued Patent: Jan. 12, 2021

(54) METHOD AND SYSTEM FOR DYNAMIC CELL CONFIGURATION

(71) Applicant: Huawei Technologies Co., Ltd., Shenzhen (CN)

(72) Inventors: Jianglei Ma, Ottawa (CA); Peiying Zhu, Kanata (CA); Wen Tong, Ottawa (CA)

(73) Assignee: Huawei Technologies Co., Ltd., Shenzhen (CN)

(21) Appl. No.: 15/995,880

(22) Filed: Jun. 1, 2018

Related U.S. Patent Documents

Reissue of:
(64) Patent No.: 8,838,119
Issued: Sep. 16, 2014
Appl. No.: 13/533,631
Filed: Jun. 26, 2012

U.S. Applications:
(63) Continuation of application No. 15/261,269, filed on Sep. 9, 2016, now Pat. No. Re. 47,191, which is an application for the reissue of Pat. No. 8,838,119.

(51) Int. Cl.
*H04W 16/18* (2009.01)
*H04W 16/04* (2009.01)
*H04W 16/24* (2009.01)

(52) U.S. Cl.
CPC ..... *H04W 16/04* (2013.01); *H04W 16/24* (2013.01)

(58) Field of Classification Search
CPC ..... H04W 16/02; H04W 16/18; H04W 16/24; H04W 24/00; H04W 24/02
USPC ..... 455/446, 452.1, 562.1, 422.1, 453; 370/328, 331, 332
See application file for complete search history.

(56) References Cited

U.S. PATENT DOCUMENTS 6,141,565 A 10/2000 Feuerstein et al.
8,265,629 B2 9/2012 Kwon et al.
8,300,587 B2 10/2012 Chmiel et al.
8,532,297 B2 9/2013 Hsuan et al.
8,634,868 B2 1/2014 Hedberg et al.
(Continued)

FOREIGN PATENT DOCUMENTS

CN 101014156 A 8/2007
CN 102026298 A 4/2011
(Continued)

OTHER PUBLICATIONS

Catt, "Further considerations on scenario 3 and 4," 3GPP TSG RAN WG1 Meeting #64, R1-110720, Taipei, Feb. 21-25, 2011, 3 pages.
(Continued)

*Primary Examiner* — Minh Dieu Nguyen
(74) *Attorney, Agent, or Firm* — Slater Matsil, LLP

(57) ABSTRACT

An apparatus for adapting hyper cells in response to changing conditions of a cellular network is disclosed. During operation, the apparatus collects data regarding network conditions of the cellular network. In accordance with the collected network condition data, the apparatus changes an association of a transmit point from a second cell ID of a second hyper cell to a first cell ID of a first hyper cell. Virtual data channels, broadcast common control channel and virtual dedicated control channel, transmit point optimization, UE-centric channel sounding and measurement, and single frequency network synchronization are also disclosed.

25 Claims, 8 Drawing Sheets

(56) References Cited

U.S. PATENT DOCUMENTS 8,731,001 B2 5/2014 Roman et al.
8,923,905 B2 12/2014 Montojo et al.
8,948,096 B2 * 2/2015 Tanaka ..... H04W 48/12 370/329
8,953,523 B2 2/2015 Mochizuki et al.
8,953,532 B2 2/2015 Liu et al.
8,965,443 B2 2/2015 Gao et al.
8,995,293 B2 3/2015 Jöngren et al.
9,014,020 B2 4/2015 Gao et al.
9,225,449 B2 12/2015 Heo et al.
2004/0131029 A1 * 7/2004 Tobe ..... H04W 52/322 370/331
2007/0015514 A1 1/2007 Bishop
2007/0066305 A1 3/2007 Deguchi
2008/0198798 A1 8/2008 Wu et al.
2008/0274745 A1 11/2008 Barak et al.
2009/0047955 A1 * 2/2009 Frenger ..... H04J 11/0093 455/436
2009/0060003 A1 3/2009 Hayashi et al.
2009/0238366 A1 9/2009 Park et al.
2010/0003986 A1 * 1/2010 Chen ..... H04W 36/0088 455/436
2010/0088410 A1 4/2010 Ridley
2010/0165942 A1 * 7/2010 Liao ..... H04W 56/0015 370/329
2010/0208603 A1 8/2010 Ishii
2010/0303034 A1 12/2010 Chen et al.
2011/0021205 A1 1/2011 Horneman et al.
2011/0038310 A1 2/2011 Chmiel et al.
2011/0039565 A1 * 2/2011 Brunel ..... H04W 36/0088 455/436
2011/0092220 A1 * 4/2011 Bernini et al. ..... 455/452.2
2011/0103287 A1 5/2011 Ma et al.
2011/0105184 A1 5/2011 Piirainen et al.
2011/0124341 A1 5/2011 Kubo et al.
2011/0170437 A1 7/2011 Zhou et al.
2011/0281526 A1 11/2011 Matsuda et al.
2011/0312359 A1 * 12/2011 Kolding et al. ..... 455/509
2012/0026966 A1 2/2012 Wennstrom et al.
2012/0039284 A1 * 2/2012 Barbieri et al. ..... 370/329
2012/0087299 A1 4/2012 Bhattad et al.
2012/0140660 A1 6/2012 Kang et al.
2012/0155423 A1 6/2012 Kishiyama et al.
2012/0163188 A1 6/2012 Kobayashi
2012/0184311 A1 * 7/2012 Yamamoto ..... H04W 56/002 455/502
2012/0207043 A1 * 8/2012 Geirhofer ..... H04L 5/0048 370/252
2012/0207105 A1 8/2012 Geirhofer et al.
2012/0213108 A1 8/2012 Ji et al.
2012/0236741 A1 9/2012 Xu et al.
2012/0281554 A1 11/2012 Gao et al.
2012/0281555 A1 11/2012 Gao et al.
2012/0281567 A1 11/2012 Gao et al.
2012/0281573 A1 * 11/2012 Kazmi ..... H04W 8/26 370/252
2012/0281646 A1 11/2012 Liao et al.
2012/0309291 A1 12/2012 Sawai
2013/0003639 A1 1/2013 Noh et al.
2013/0017776 A1 * 1/2013 Takano ..... H04B 7/15507 455/7
2013/0021926 A1 1/2013 Geirhofer et al.
2013/0021987 A1 1/2013 Ho et al.
2013/0039304 A1 2/2013 Pan et al.
2013/0051317 A1 2/2013 Ji et al.
2013/0114514 A1 5/2013 Nissila et al.
2013/0128760 A1 5/2013 Fujishima et al.
2013/0210438 A1 8/2013 Martin et al.
2013/0223264 A1 8/2013 Miki et al.
2013/0250863 A1 9/2013 Nogami et al.
2013/0260744 A1 10/2013 Xu et al.
2013/0279461 A1 10/2013 De Bruin et al.
2013/0286945 A1 10/2013 Ma et al.
2013/0286954 A1 10/2013 Ma et al.
2013/0286997 A1 10/2013 Davydov et al.
2013/0301439 A1 11/2013 Heo et al.
2013/0315195 A1 11/2013 Ko et al.
2014/0003268 A1 1/2014 Zarifi et al.
2014/0050191 A1 2/2014 Kim et al.
2014/0064201 A1 3/2014 Zhu et al.
2014/0079009 A1 3/2014 Liu et al.
2014/0098779 A1 4/2014 Kim et al.
2014/0133477 A1 * 5/2014 Siomina ..... H04W 56/0055 370/350
2014/0369219 A1 12/2014 Wang et al.
2015/0065145 A1 * 3/2015 Huang ..... H04W 52/40 455/438

FOREIGN PATENT DOCUMENTS

CN 102265680 A 11/2011
CN 102315871 A 1/2012
CN 102325382 A 1/2012
WO 2011038272 A1 3/2011
WO 2012026318 3/2012
WO 2012134565 A1 10/2012
WO 2014064201 A1 5/2014

OTHER PUBLICATIONS

Fujitsu, "Consideration of antenna virtualization in DL MIMO scenario B," 3GPP TSG RAN WG1 meeting #66bis, R1-113500, Zhuhai, China, Oct. 10-14, 2011, 4 pages.
3GPP TR 36.819 v11.1.0 (Dec. 2011), 3rd Generation Partnership Project; Technical Specification Group Radio Access Network; Coordinated multi-point operation for LTE physical layer aspects (Release 11), 69 pages.
3GPP TSG RAN WG1 Meeting #66bis, R1-113035, "Considerations on RRH subset selection mechanism," Potevio, Oct. 10-14, 2011, 3 pages.
3GPP TSG RAN WG1 meeting#68, R1-120496, "CoMP Operation and UE Mobility," Alcatel-Lucent, Alcatel-Lucent Shanghai Bell, Feb. 6-10, 2012, 5 pages.
Samsung, "Interference Measurement Resource for Downlink CoMP," 3GPP TSG RAN WG1 #68bis, R1-121627, Jeju, Korea, Mar. 26-30, 2012, 5 pages.

* cited by examiner

METHOD AND SYSTEM FOR DYNAMIC CELL CONFIGURATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 8,838,119 issued Sep. 16, 2014; the present application is an application for reissue of U.S. Pat. No. 8,838,119, and is a continuation of U.S. patent application Ser. No. 15/261,269 filed Sep. 9, 2016, which also is an application for reissue of U.S. Pat. No. 8,838,119; the present application also is related to U.S. patent application Ser. No. 15/995,803 filed Jun. 4, 2018, Ser. No. 15/996,238 filed Jun. 1, 2018, Ser. No. 16/000,228 filed Jun. 1, 2018, Ser. No. 15/996,239 filed Jun. 1, 2018, Ser. No. 15/996,067 filed Jun. 1, 2018, Ser. No. 15/997,230 filed Jun. 4, 2018, Ser. No. 15/997,280 filed Jun. 4, 2018, Ser. No. 15/997,317 filed Jun. 4, 2018, Ser. No. 15/996,118 filed Jun. 1, 2018, Ser. No. 15/996,242 filed Jun. 1, 2018, and Ser. No. 15/996,228 filed Jun. 5, 2018, all of which are applications for reissue of U.S. Pat. No. 8,838,119 and continuations of U.S. patent application Ser. No. 15/261,269, which also is an application for reissue of U.S. Pat. No. 8,838,119.*

BACKGROUND

1. Field

This disclosure is generally related to improving performance of cellular networks. More specifically, this disclosure is related to a method and system for dynamically generating and adapting hyper cells in response to network conditions. Various embodiments are also related to selecting optimal transmit points for virtual channels.

2. Related Art

In traditional cellular networks, the location of each transmit point is carefully planned. Each transmit point creates a cell and is assigned a unique cell identifier (ID) to define the control channel and data channel so that simultaneous transmit point to user equipment (UE) communications can be supported for each cell. A single cell serves each UE, and the network maintains the association between the cell and the UE until handover is triggered.

As the demand on mobile broadband increases, networks are deployed more densely and heterogeneously with a greater number of base stations. Cells become smaller and a corresponding greater number of cell edges are created. Cell ID assignment becomes more difficult and the frequency of handovers increases as the UE moves between cells. Further, the density of the cells creates much interference between neighboring cells.

In one approach, LTE Coordinated Multipoint (CoMP) scenario 4 specifies that one or more remote radio heads (RRHs) share a same cell ID as a macro cell to which the RRHs are connected. However, LTE CoMP scenario 4 (available at http://www.3gpp.org/ftp/Specs/html-info/36819.htm) only allows fixed sharing of a single cell ID between a macro cell and all RRHs controlled by it. There is handover and changing of the cell ID when the user moves away from the macro cell and the connected RRHs. Such an approach is insufficient for addressing the problems of interference, complex cell ID assignment, and frequent handovers.

SUMMARY

One embodiment of the present invention provides a system for adapting hyper cells in response to changing conditions of a cellular network. During operation, the system collects data regarding network conditions of the cellular network; in accordance with the collected data, determines that a transmit point is to be added to a first hyper cell, wherein the first hyper cell includes at least one transmit point associated with a first cell identifier (ID); and changes an association of the transmit point from a second cell ID to the first cell ID, wherein at least one transmit point of a second hyper cell is associated with the second cell ID.

Another embodiment of the present invention provides a system for transmitting virtual channels in a cellular network. The system includes a virtual channel transmission mechanism configured to select one or more transmit points from a set of transmit points to transmit a virtual dedicated control channel and/or a virtual data channel to a serviced UE, wherein the one or more transmit points share a common cell ID; and wherein one or more transmission schemes of the virtual data channel and virtual dedicated control channel, including scrambling, pilot design, and/or pilot sequence and location, are created in accordance with a UE ID.

A further embodiment of the present invention provides a method for transmitting virtual channels in a cellular network. The method includes selecting one or more transmit points from a set of transmit points to transmit a virtual dedicated control channel and/or a virtual data channel to a serviced user equipment (UE), wherein the one or more transmit points share a common cell ID; and wherein one or more transmission schemes of the virtual data channel and virtual dedicated control channel, including scrambling, pilot design, and/or pilot sequence and location, are created in accordance with a UE ID.

A further embodiment of the present invention provides a method for adapting hyper cells in response to changing conditions of a cellular network. The method includes collecting data regarding network conditions of the cellular network; in accordance with the collected data, determining that a transmit point is to be added to a first hyper cell, wherein the first hyper cell includes at least one transmit point associated with a first cell ID; and changing an association of the transmit point from a second cell ID to the first cell ID, wherein at least one transmit point of a second hyper cell is associated with the second cell ID.

BRIEF DESCRIPTION OF THE FIGURES

In the figures, like reference numerals refer to the same figure elements.

DETAILED DESCRIPTION

Figure 1A:
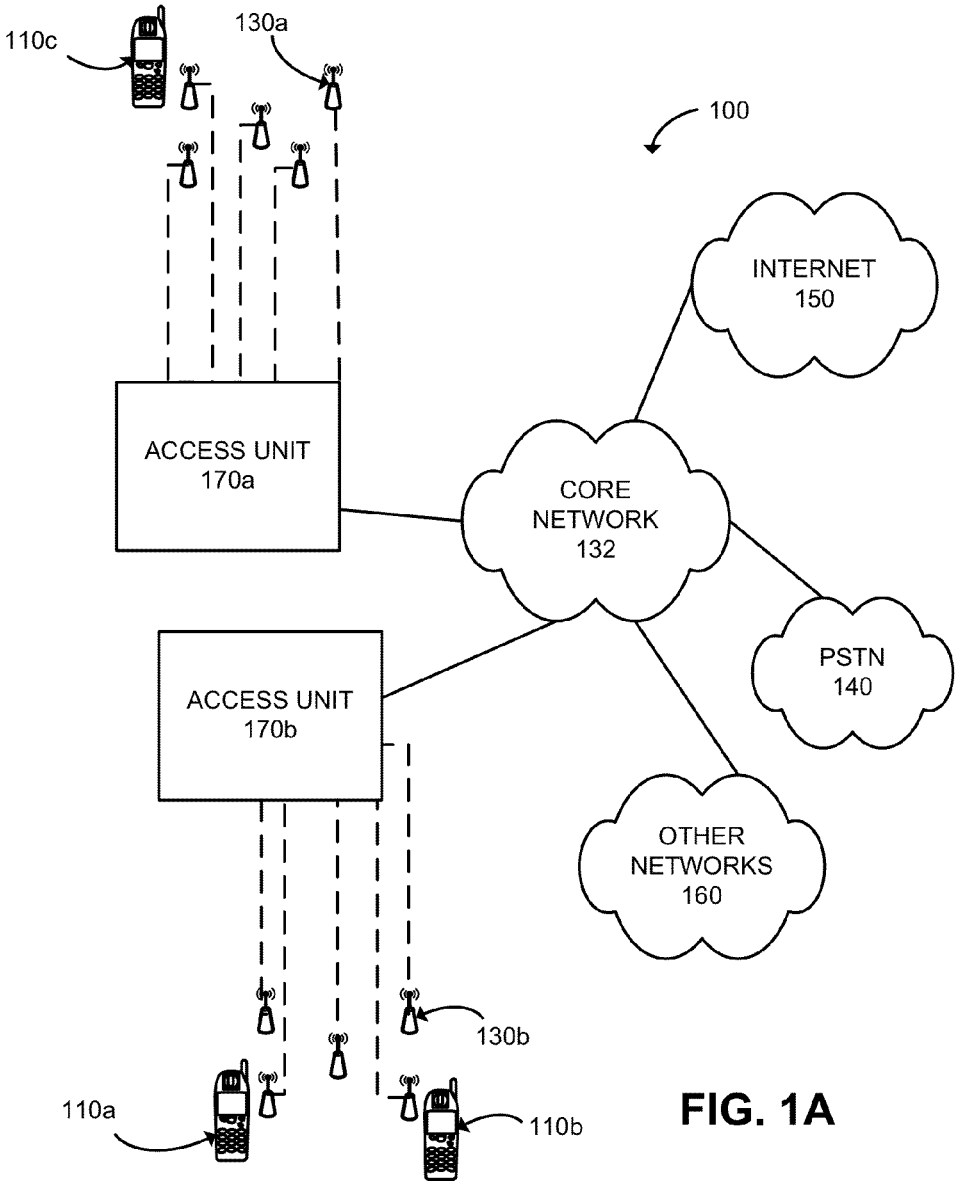
FIG. 1A illustrates an exemplary CRAN communication system from which hyper cells may be generated, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problems of excessive interference and management overhead in cellular networks by introducing the concept of "hyper cell" and dynamically managing hyper cells to eliminate cell edge UEs and optimally selecting transmit points for UEs. A hyper cell is a virtual entity for dynamical coordination of data and control signaling transmission. It is a logic cell and the coverage of the hyper cell can change depending on the hyper cell's association to the physical transmit point(s). From the perspective of network, a hyper cell includes a group of transmit points which have relatively strong interference and are connected via high capacity backhaul. From the perspective of a UE, a hyper cell is an area covered by a virtual access entity.

A dynamic cell configuration system disassociates the concept of cell IDs from the physical topology of the cellular network, which facilitates greater flexibility and efficiency in network management. By breaking the bind between the cell ID and the physical transmitter, the system can generate hyper cells that include multiple transmit points having the same cell ID. The system adapts the hyper cells according to network topology, load distribution, and UE distribution. This reduces the frequency of handovers and amount of interference. The system can also share transmit points between multiple hyper cells by switching the transmit point between the hyper cells. This hyper cell configuration reduces the number of cell edge UEs, reduces interference, and improves the UE transition between hyper cells. The system can further select optimal transmit points within the hyper cells to boost the capacity of virtual channels. In addition, the virtual control channels and virtual data channel can be de-coupled for optimal performance.

Network Environment

A cloud radio access network (CRAN) cluster consolidates all basic processing power of a cellular network. The CRAN manages a group of transmit points that are connected together with a high-speed backhaul network. A CRAN central processing unit performs the processing for the multiple transmit points. This brings the network intelligence into the cloud, leaving only the radios and antennas at the transmission site. By centralizing all the active electronics of multiple cell sites at one location, the operating costs are minimized.

In one embodiment, in a CRAN cluster, a supernode generates a hyper cell by assigning the same cell ID to one or more transmit point(s) which have the strongest mutual inter-cell interference. The supernode may estimate inter-cell interference based on UE reports or the measurement at transmit points. A supernode can be a base station, computing station, or controller configured to generate and manage hyper cells. The supernode can manage baseband signal processing of all transmit points controlled by the supernode. In some implementations, the supernode can also be responsible for only part of signal processing, depending on backhaul capability.

The cell ID is a logical assignment to all physical transmit points of the hyper cell. The hyper cell may be dynamically configured. Unlike traditional cellular networks, there is no fixed one-to-one mapping relation between a transmit point and a cell ID. The area served by the hyper cell is amorphous and the system dynamically adds/removes transmit points to/from the hyper cell.

In one embodiment, the system supports overlapped hyper cells where a transmit point can be logically associated with different hyper cells. For the transmitters that are physically located at the boundary of hyper cells, logically the network associates the transmit point with different hyper cells at different points in time, frequency, or space. The hyper cells may share the resources of the transmit point. A shared transmit point can reduce interference for UEs located at the boundary between the two sharing hyper cells. UEs that are located near the boundaries of two hyper cells experience less handovers because the shared transmit point is associated with either hyper cell at different times, frequencies or spatial directions. Further, as a UE moves between the two hyper cells, the transition is a smoother experience for the user. In one embodiment, the network changes the cell ID of the transmit point to transition a user moving between hyper cells.

Embodiments of the present invention also facilitate virtual channels which allow for greater scheduling flexibility, increased data and control channel capacity, energy savings, and improved mobility management. Subsequent sections of this disclosure discuss five aspects of virtual channels and/or hyper cells in greater detail. These five aspects are: virtual data channels, broadcast common control channel and virtual dedicated control channel, transmit point optimization, UE-centric channel sounding and measurement, and single frequency network (SFN) synchronization. The virtual data channel, broadcast common control channel, virtual dedicated control channel, and/or synchronization channel can also be implemented separate from the hyper cells.

In one embodiment, the supernode is a part of a system that manages all aspects of hyper cells and virtual channels. The system can also include a hyper transceiver to enable joint scheduling and joint transmission for a hyper cell. Each hyper cell supports a single centralized data plane and a single centralized control plane. In one embodiment, a CRAN subcluster supernode or CRAN cluster supernode generates the virtual data channels, broadcast common control channel and virtual dedicated control channels of the hyper cell.

CRAN Communication System

FIG. 1A illustrates an exemplary CRAN communication system 100 from which hyper cells may be generated, in accordance with an embodiment of the present invention. Generally, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA). Although FIG. 1A illustrates an example architecture for hyper cells, embodiments of the invention are not limited to a particular architecture. Other network architectures for hyper cells are also possible. For example, any network architecture where transmit points in the network are controlled by one or more supernodes with centralized signal processing capability can also work with hyper cells.

In this example, communication system 100 includes user equipment (UE) 110a-110c, transmit points 130a-130b, two access units 170a-170b, a core network 132, a public switched telephone network (PSTN) 140, the Internet 150, and other networks 160. While certain numbers of these components or elements are shown in FIG. 1A, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user device, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

Access units 170a, 170b can each be a base station controlling transmitters or a controller controlling multiple base stations. A base station can control multiple transmitters. Transmit points 130a, 130b can be any type of transmitter. The transmitters can be, for example, mobile-relay station, base station transmitter, pico transmitter, or femto transmitter. The transmitters can be remote radio heads (RRHs) in some implementations. The transmit points can also be base stations controlled by a controller. In some embodiments, multiple-input multiple-output (MIMO) technology may be employed having multiple transceivers for each cell.

Each access unit 170a-170b is configured to wirelessly interface with one or more of the UEs 110a-110c to enable access to the core network 132, the PSTN 140, the Internet 150, and/or the other networks 160. In various embodiments, the access units 170a-170b (or transmit points 130a, 130b) may also include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. One or more Node-B may be controlled by radio network controllers.

In an embodiment, CRAN systems can include a base station or a centralized node controlling one or more RRHs. Base stations can implement MAC/PHY and antenna array system (AAS) functionality. Each base station operates to transmit and/or receive wireless signals within a particular geographic region or area. For example, access units 170a-170b can be base stations and, through remote radio heads, may communicate with one or more of the UEs 110a-110c over one or more air interfaces using wireless communication links. The air interfaces may utilize any suitable radio access technology.

A RRH contains the radio frequency circuitry plus analog-to-digital/digital-to-analog converters and up/down converters. The RRHs are located between a base station and the UEs, and are connected to a base station using optical fiber or any other communication line. The RRHs receive and convert digital signals to analog, then amplifies the power and sends the radio frequency signals.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

Each of the access units 170a, 170b are in communication with the core network 132 to provide the UEs 110a-110c with voice, data, application, Voice over Internet Protocol (VoIP), or other services. The access units and/or the core network 132 may be in direct or indirect communication with one or more other access units (not shown). The core network 132 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Each of the example transmit points 130a-130b, or any combination of the illustrated transmit points, may be assigned a common cell ID and form a hyper cell. Hyper cells are discussed in greater detail with respect to FIG. 1B.

Although FIG. 1A illustrates one example of a CRAN communication system 100 from which hyper cells may be generated, various changes may be made to FIG. 1A. For example, CRAN communication system 100 could include any number of UEs, base stations, supernodes, networks, or other components in any suitable configuration. Also, the techniques described herein can be used in any other suitable system.

Hyper Cell Examples

Figure 1B:
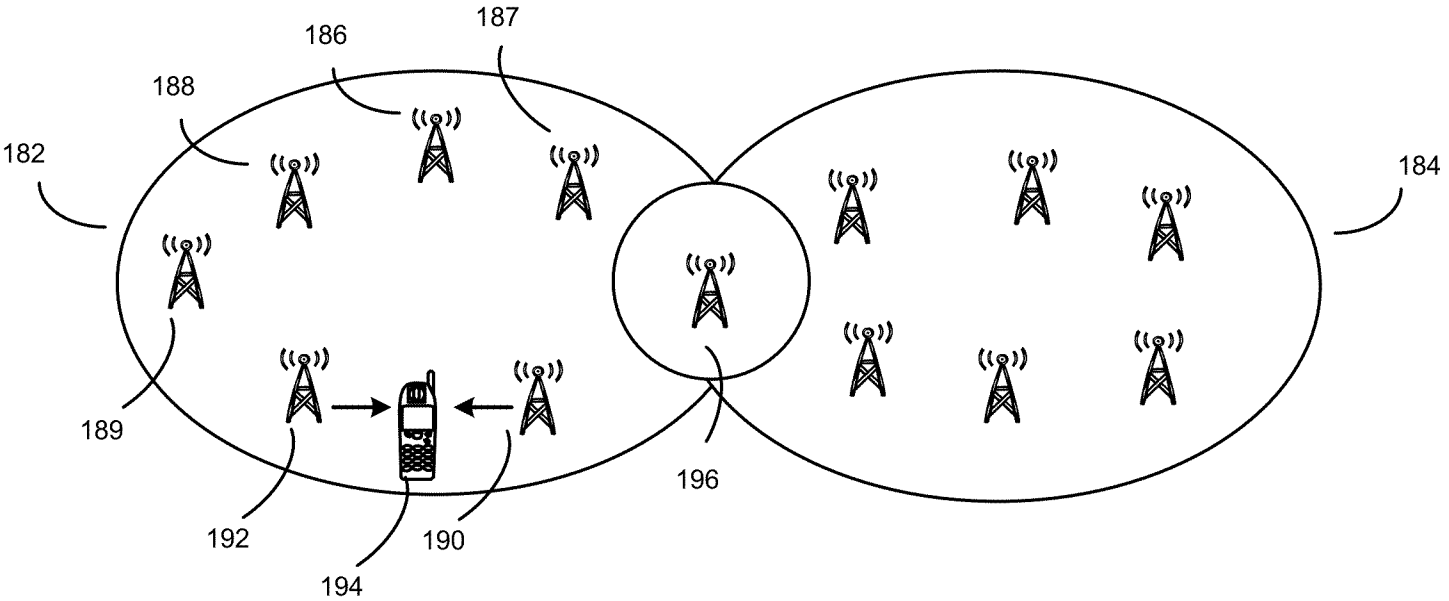
FIG. 1B illustrates two hyper cells with a shared transmit point, in accordance with an embodiment of the present invention.

FIG. 1B illustrates two hyper cells with a shared transmit point, in accordance with an embodiment of the present invention. Hyper cells 182, 184 each includes many transmit points that are assigned the same logical cell ID. For example, hyper cell 182 includes transmit points 186, 187, 188, 189, 190, and 192. Transmit points 190, 192 communicates with UE 194. Transmit point 196 is assigned to hyper cells 182, 184 at different times, frequencies or spatial directions and the system switches the logical cell ID for transmit point 196 between the two hyper cells. In one embodiment, a system dynamically updates the hyper cell topology to adapt to changes in network topology, load distribution, and/or UE distribution. The system may include a data collector to collect data regarding network conditions of the cellular network. If the concentration of UEs increases in one region, the system may dynamically expand the hyper cell to include transmit points near the higher concentration of UEs. For example, the system may expand hyper cell 182 to include other transmit points if the concentration of UEs located at the edge of the hyper cell increases above a certain threshold. As another example, the system may expand hyper cell 182 to include a greater concentration of UEs located between two hyper cells. Also, if the traffic load increases significantly at one region, the system may also expand the hyper cell to include transmit points near the increased traffic load. For example, if the traffic load of a portion of the network exceeds a predetermined threshold, the system may change the cell IDs of one or more transmit points that are transmitting to the impacted portion of the cellular network.

Further, the system may change the cell ID associated with transmit point 196 from the cell ID of hyper cell 182 to the cell ID of hyper cell 184. In one implementation, the system can change the association of a transmit point with different hyper cells every 1 millisecond. With such a flexible cell formation mechanism, all UEs can be served by the best transmit points so that virtually there are no cell edge UEs.

In one embodiment, the system may also save power by turning off silent transmit points (e.g., any transmit point other than transmit points 190, 192) if there are no UEs to service for those silent transmit points. The system can also save power by turning off transmit points according to some criteria (e.g., turn off those that are serving less than a threshold number of UEs).

Figure 2:
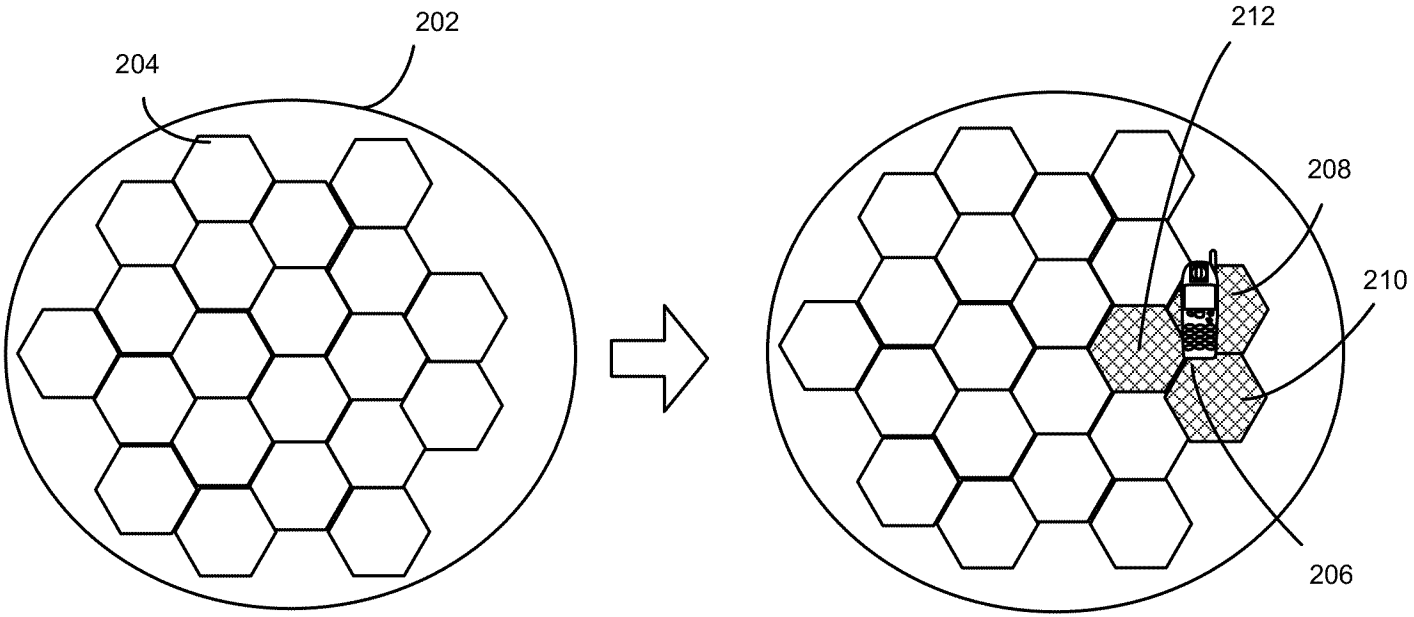
FIG. 2 presents a diagram illustrating an example of how to create hyper cells in a CRAN cluster, in accordance with an embodiment of the present invention.

FIG. 2 presents a diagram illustrating an example of how to create hyper cells in a CRAN cluster, in accordance with an embodiment of the present invention. A CRAN cluster 202 includes a number of individual cells, such as cell 204. Without hyper cells, the CRAN network can only assign each transmit point a unique cell ID to form the individual cells. To create a hyper cell, the system assigns a common cell ID to all the cells of the CRAN cluster that form the hyper cell. In one embodiment, the network may create multiple hyper cells within a CRAN cluster. Each hyper cell has a unique cell ID.

FIG. 2 also illustrates exemplary optimal transmit points for facilitating a virtual data channel and virtual dedicated control channel for UE 206. The three transmit points 208, 210, and 212 are optimally situated to transmit the virtual channels to UE 206. The three transmit points form a virtual transmit point. The system can dynamically combine multiple physical transmitters to form a virtual transmit point. From the perspective of a UE, the virtual transmit points appear to be a single transmitter. The system can create many virtual transmit points for a hyper cell and coordinate their transmissions. The system can dynamically change the physical transmitters that make up the hyper cell. Determining optimal transmit points is further discussed with respect to FIG. 5 and FIG. 6.

Virtual Data Channels

Figure 3:
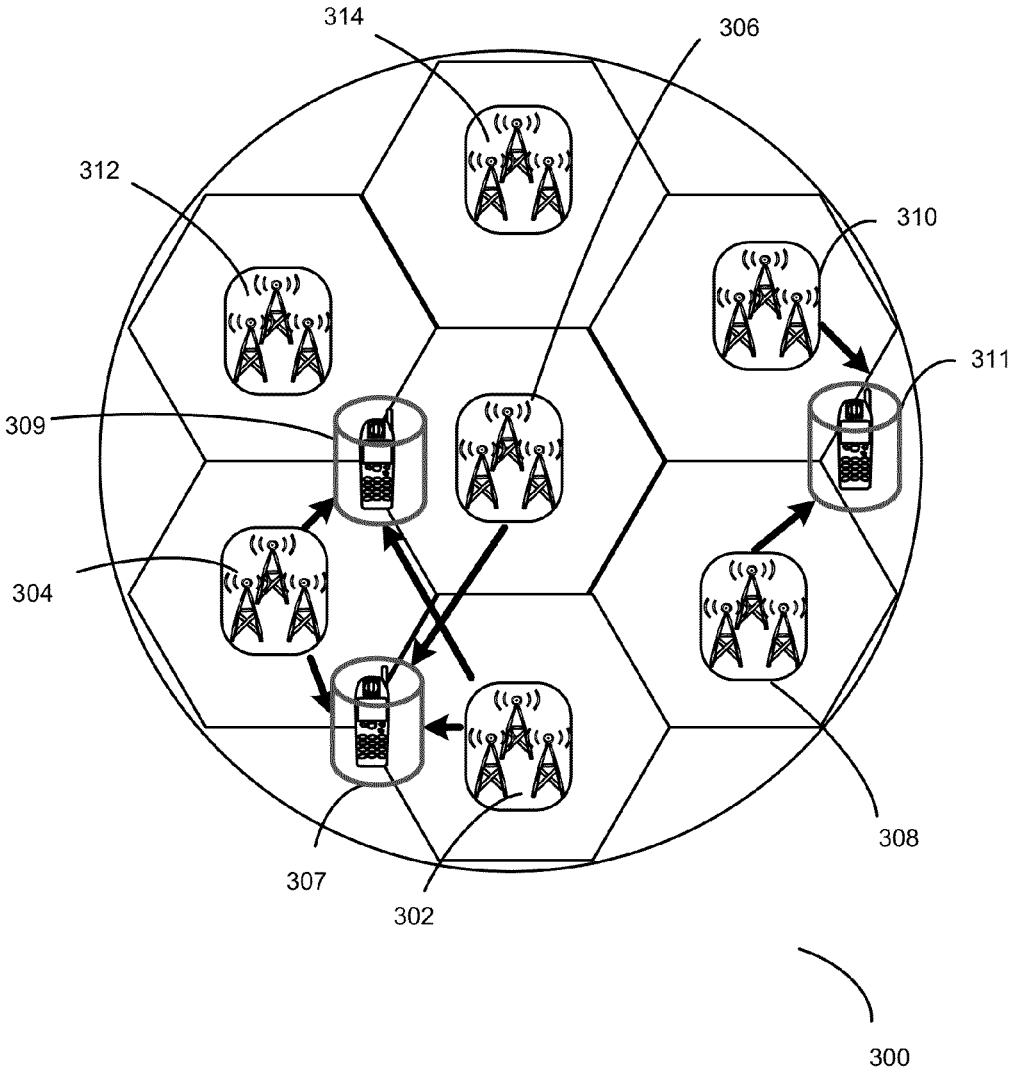
FIG. 3 presents a diagram of an example hyper cell with multiple virtual data channels, in accordance with an embodiment of the present invention.

FIG. 3 presents a diagram of an example hyper cell with multiple virtual data channels, in accordance with an embodiment of the present invention. The system can support multiple parallel data channels within a single hyper cell, each serving a different UE. In other words, each virtual data channel is UE-specific. The hyper cell may have multiple different physical transmit points transmitting to create the virtual data channels. The actual physical transmit points of the virtual data channels are also UE-specific and are transparent to each UE. A UE distinguishes virtual data channel signals by examining the UE ID associated with each transmission. The data transmission schemes, including data scrambling, pilot design, and pilot sequence and location, are all created in accordance with the UE ID.

As the UEs move to different locations, the system dynamically assigns different physical transmit points to service the UEs. The physical transmit points form the virtual data channels for the respective serviced UEs. Note that the cell ID transmitted from the different physical transmit points belonging to the same hyper cell remains the same. As illustrated in FIG. 3, an example hyper cell 300 has three virtual data channels, one for each UE. Three transmit points 302, 304, 306 provide a virtual data channel for UE 307, two transmit points 302, 304 provide a virtual data channel for UE 309, and two transmit points 308, 310 provide a virtual data channel for UE 311. Transmit points 312, 314 are silent and may be turned off to save energy. The description associated with FIG. 5 and FIG. 6 discusses additional details of various embodiments for optimally selecting transmit points.

In one embodiment, with the CRAN framework, the supernode controls the generation of the virtual data channels based on load balancing and UE distribution within a CRAN cluster. A CRAN cluster can support multiple parallel virtual data channels.

Broadcast Common Control Channel/Virtual Dedicated Control Channel

Figure 4:
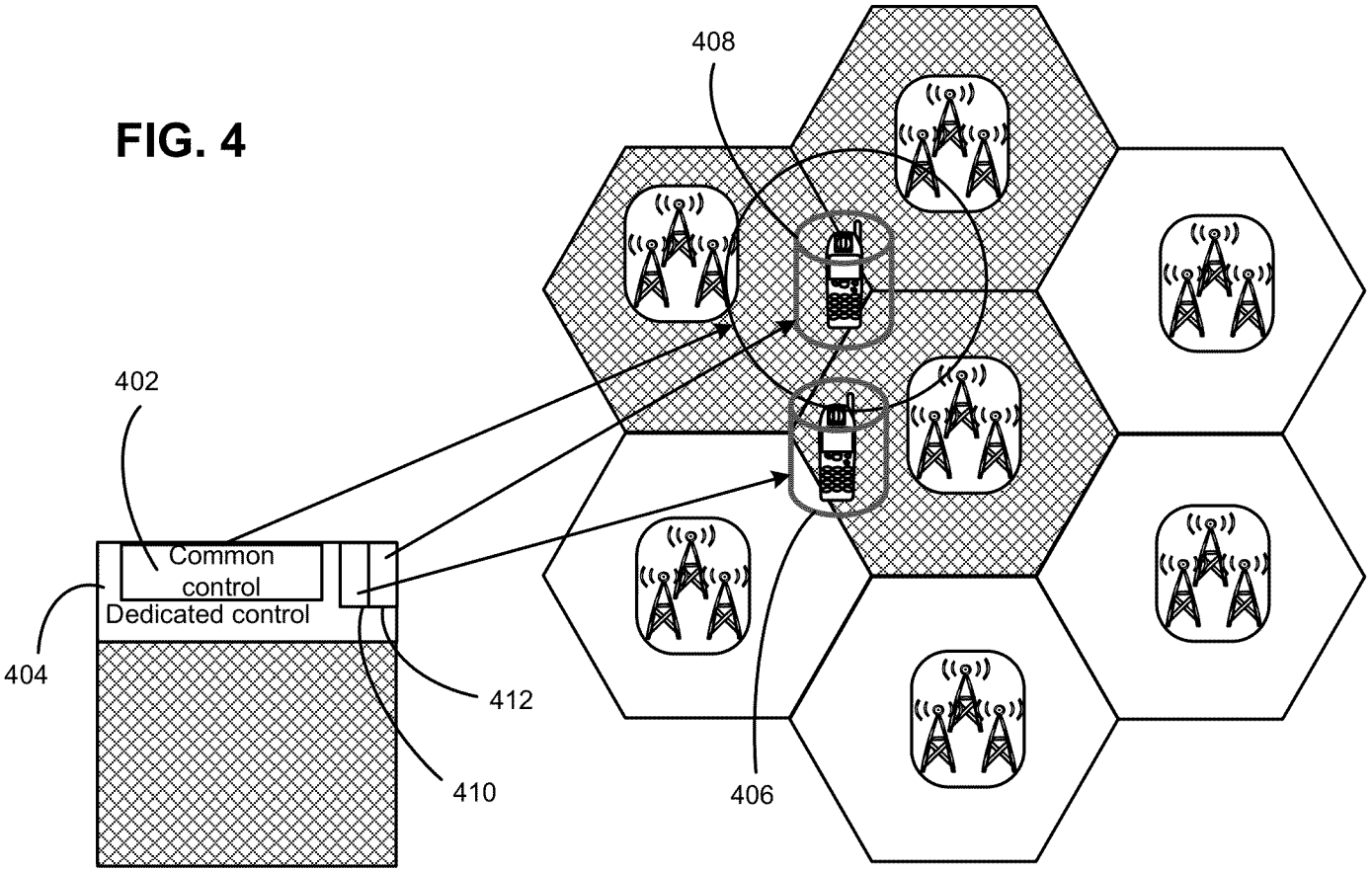
FIG. 4 presents a diagram illustrating an exemplary downlink (DL) control channel design, in accordance with an embodiment of the present invention.

FIG. 4 presents a diagram illustrating an exemplary downlink (DL) control channel design, in accordance with an embodiment of the present invention. The system provides for a broadcast common control channel and a virtual dedicated control channel. A broadcast common control channel 402 carries common system configuration information transmitted by all or partial transmit points sharing the same cell ID. Every UE can decode information from the broadcast common control channel 402 in accordance with a common reference signal (CRS). The CRS sequence and location are tied to the cell ID of the hyper cell.

A virtual dedicated control channel 404 carries UE-specific control information (e.g., DL scheduling, uplink (UL) grant). Each of UEs 406, 408 has a subset of transmit points surrounding the UE. The transmit points transmit the UE-specific virtual dedicated control channels 410, 412. Virtual dedicated control channel 410 is specific to UE 406, and virtual dedicated control channel 412 is specific to UE 408. In some embodiments, one or more transmission schemes of the virtual data channel and/or the virtual dedicated control channel, including scrambling, pilot design, and/or pilot sequence and location, are created in accordance with a UE ID. Further, a hyper cell ID can be applied together with the UE ID to differentiate transmission of the virtual data channel and/or virtual control channel from different hyper cells.

Parallel virtual dedicated control channels can be provided in each hyper cell. The demodulation of each virtual dedicated control channel is performed in accordance with a UE-specific reference signal (RS), the sequence and location of which are linked to the UE ID. To distinguish the virtual dedicated control channels communicated from different hypercells, the sequence of UE-specific RS is covered by a sequence specific to each hyper cell.

The system may apply transmit point selection techniques and transmit power control techniques to minimize intra-hyper cell interference and inter-hyper cell interference. The selected transmit points are transparent to the UEs. In one embodiment, for a UE with a poor Signal to Interference plus Noise Ratio (SINR), the system can transmit the virtual dedicated control channel and/or virtual data channel from multiple transmit points to improve signal quality. In addition, the system may apply Transmit Time Interval (TTI) bundling to a fixed or slow moving UE in order to further enhance the capacity of the UE-specific virtual dedicated control channel.

Selecting Transmit Points for Virtual Channels

Figure 5:
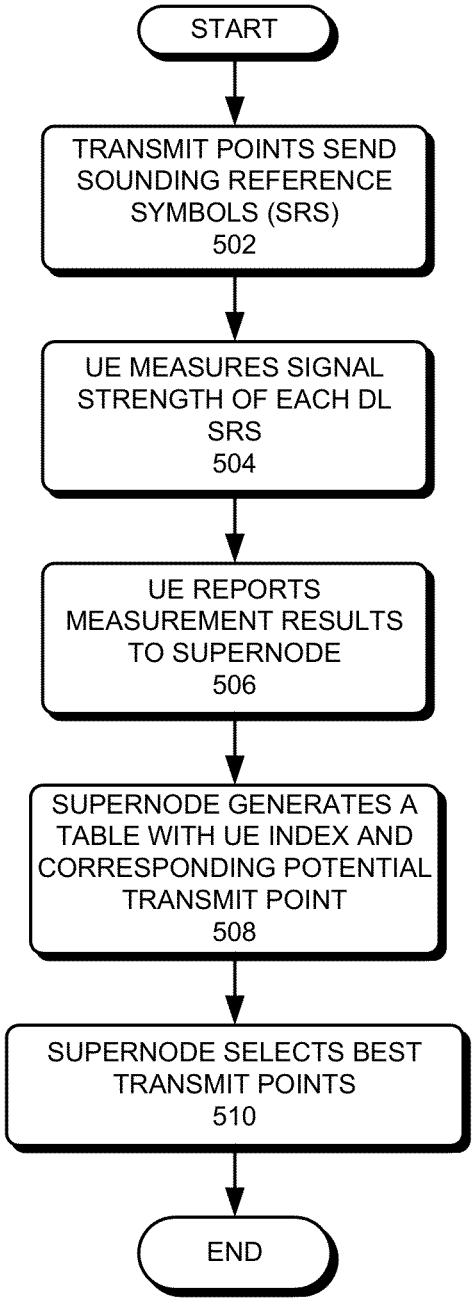
FIG. 5 and FIG. 6 each present a flow chart illustrating a process of selecting transmit points for a virtual data channel and/or a virtual dedicated control channel, in accordance with an embodiment of the present invention.
Figure 6:
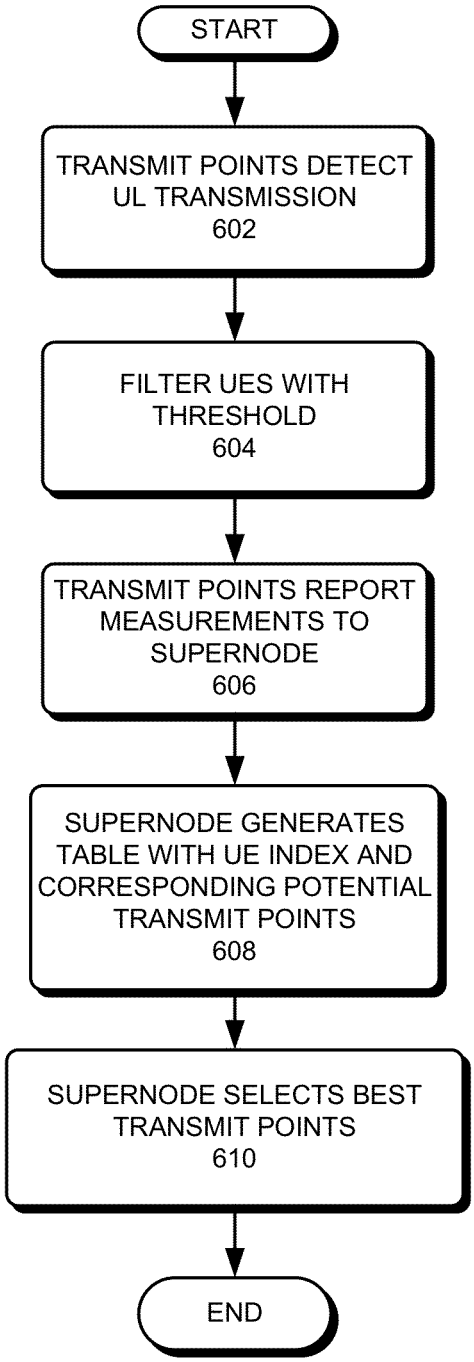

FIG. 5 and FIG. 6 each present a flow chart illustrating a process of selecting transmit points for a virtual data channel and/or a virtual dedicated control channel, in accordance with an embodiment of the present invention. A virtual channel transmission mechanism can be configured to select one or more transmit points from a set of transmit points to transmit a virtual dedicated control channel and/or a virtual data channel to a serviced UE. For each UE, there are two techniques for selecting the optimal transmit points for the virtual data channel and the virtual dedicated control channel. The selection processes attempt to maximize the capacity of the UE-specific virtual dedicated control channel and virtual data channel. FIG. 5 presents a UE-centric technique for selecting the transmit points. FIG. 6 presents a network-centric technique for selecting the transmit points. The transmit points for a virtual data channel can be different from the transmit points for a virtual dedicated control channel, for the same UE. The selected transmit points are transparent to the UE.

During operation of the technique illustrated in FIG. 5, each of the transmit points sends a DL sounding reference signal (SRS) (operation 502) as a training sequence. In one embodiment, different transmit points transmit the DL SRS at different frequencies or at different times. After receiving the DL SRS, the UE measures the signal strength of each DL SRS (operation 504). The UE reports the measurement results to the supernode (operation 506). The supernode generates a table with a UE index and corresponding potential transmit points (operation 508). The supernode selects the best transmit points to all served UEs based on the table and the status of network load distribution and UE distribution (operation 510). In one embodiment, the supernode compares the reported measurement results to previous DL SRS transmissions to determine the best transmit points for each of the UEs.

During operation of the technique illustrated in FIG. 6, each transmit point detects a UL transmission from a UE within the transmit point's coverage range. The transmissions may be for any data, including any one of a sounding channel, control channel and/or data channel data (operation 602). The transmit points measure the strength of the UE signals. The transmit point may filter UEs with insufficient signal strength (operation 604). Each transmit point reports measurements of the detected UL transmissions to the supernode (operation 606). The supernode generates a table with the UE index and corresponding potential transmit points (operation 608). In one embodiment, the supernode populates the table with UEs and the strength of signals received by the transmit points. The supernode selects the optimal transmit points for all served UEs based on the generated table and on the status of network load and UE distribution (operation 610).

In one embodiment, to maintain the transparency of the transmit points in each hyper cell, demodulation of the virtual channels is not tied to the transmit points. In one implementation, the system uses the UE ID to bootstrap all communications between the UE and the transmit points. The system distinguishes between the transmission signals of different UEs with a UE-centric reference signal. The system uses a UE-centric demodulation reference signal (DMRS) to decode the virtual dedicated data channel and the virtual dedicated control channel. The system defines the sequence and location of the UE-centric DMRS with the UE index. The system automatically generates each UE index from a respective UE ID or assigns the UE index. Each UE has a unique UE index.

Each hyper cell is associated with a synchronization channel. All or a portion of transmit points in a hyper cell can transmit the synchronization channel. In one embodiment, a transmit point belonging to multiple hyper cells does not transmit the synchronization channel. In another embodiment, frequency division multiplexing (FDM), code division multiplexing (CDM), or time division multiplexing (TDM) can be applied to enable synchronization channel transmission for transmit points associated with multiple hyper cells.

Figure 7:
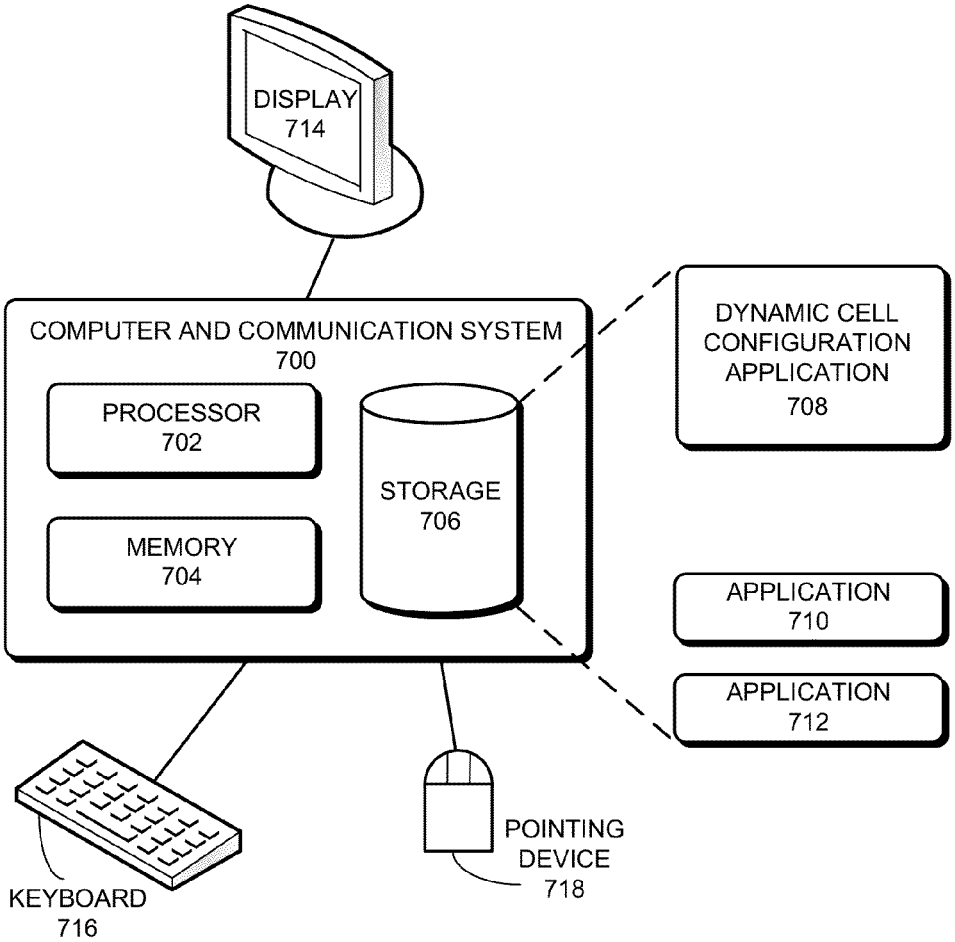
FIG. 7 illustrates an exemplary computing system for enabling dynamic hyper cell configuration, in accordance with an embodiment of the present invention.

FIG. 7 illustrates an exemplary computing system for enabling dynamic hyper cell configuration, in accordance with an embodiment of the present invention. In one embodiment, a computing and communication system 700 includes a processor 702, a memory 704, and a storage device 706. Storage device 706 stores a dynamic hyper cell configuration application 708, as well as other applications, such as applications 710 and 712. During operation, application 708 is loaded from storage device 706 into memory 704 and then executed by processor 702. While executing the program, processor 702 performs the aforementioned functions. Computing and communication system 700 is coupled to an optional display 714, keyboard 716, and pointing device 718.

The data structures and code described in this detailed description are typically stored on a machine-readable storage medium, which may be any device or medium that can store code and/or data for use by a computing system. The machine-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing machine-readable media now known or later developed.

The methods and processes described in the detailed description section can be embodied as code and/or data, which can be stored in a machine-readable storage medium as described above. When a computing system reads and executes the code and/or data stored on the machine-readable storage medium, the computing system performs the methods and processes embodied as data structures and code and stored within the machine-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them. Such modules or apparatuses may form part of base stations or supernode machines that manage and enable hyper cells and/or virtual channels or other various features described herein.

*An embodiment method for adapting hyper cells in response to changing conditions of a cellular network comprises collecting data regarding network conditions of the cellular network; in accordance with the collected data, determining that a transmit point is to be added to a first hyper cell, wherein the first hyper cell includes at least one transmit point associated with a first cell identifier (ID); and changing an association of the transmit point from a second cell ID to the first cell ID, wherein at least one transmit point of a second hyper cell is associated with the second cell ID.*

*Optionally, in the embodiment method, the network conditions include load distribution, and the method further comprises determining that a traffic load of a portion of the cellular network exceeds a predetermined threshold; and changing cell IDs of one or more transmit points transmitting to the portion of the cellular network.*

*Optionally, in the embodiment method, the network conditions include UE distribution across the network, and the method further comprises determining that a concentration of user equipments (UEs) serviced by the cellular network at a boundary of the first hyper cell is above a predetermined*

*threshold; and changing cell IDs of one or more transmit points to the cell ID of the first hyper cell, wherein the one or more transmit points transmit to the boundary of the first hyper cell.*

*Optionally, the embodiment method further comprises determining that a second transmit point serves less than a threshold number of UEs; and turning off the second transmit point in response to determining that the second transmit point is serving less than the threshold number of UEs.*

*An embodiment apparatus for adapting hyper cells in response to changing conditions of a cellular network comprises at least one collector configured to collect data regarding network conditions of the cellular network; at least one processing unit configured to: determine that a transmit point is to be added to a first hyper cell in accordance with the collected data, wherein the first hyper cell includes at least one transmit point associated with a first cell identifier (ID); and change an association of the transmit point from a second cell ID to the first cell ID, wherein at least one transmit point of a second hyper cell is associated with the second cell ID.*

*Optionally, in the embodiment apparatus, the network conditions include load distribution, and the at least one processing unit is configured to determine that a traffic load of a portion of the cellular network exceeds a predetermined threshold; and change cell IDs of one or more transmit points transmitting to the portion of the cellular network.*

*Optionally, in the embodiment apparatus the network conditions include user equipment (UE) distribution across the network, and the at least one processing unit is configured to determine that a concentration of UEs serviced by the cellular network at a boundary of the first hyper cell is above a predetermined threshold; and change cell IDs of one or more transmit points to the cell ID of the first hyper cell, wherein the one or more transmit points transmit to the boundary of the first hyper cell.*

*Optionally, in the embodiment apparatus the at least one processing unit is configured to determine that a second transmit point serves less than a threshold number of UEs; and turn off the second transmit point in response to determining that the second transmit point is serving less than the threshold number of UEs.*

*Optionally, in the embodiment apparatus the apparatus is a base station controlling one or more remote radio heads and the base station is adapted to dynamically change one or more cell identifier (ID) in response to changing network conditions, wherein the base station is connected to each of the one or more remote radio heads via a communication line; the one or more remote radio heads are adapted to receive and transmit radio frequency signals; the base station includes a data collector configured to collect data regarding network conditions of the cellular network; and the base station includes at least one processing unit configured to determine that a transmit point is to be added to a first hyper cell in accordance with the collected data, wherein the first hyper cell includes at least one transmit point associated with a first cell ID; and change an association of the transmit point from a second cell ID to the first cell ID, wherein at least one transmit point of a second hyper cell is associated with the second cell ID, and wherein the transmit point is a remote radio head.*

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

[1. A method for adapting hyper cells in response to changing conditions of a cellular network, the method comprising:

collecting data regarding network conditions of the cellular network, the cellular network utilizing a wireless protocol;

in accordance with the collected data, determining that a first transmit point associated with a second hyper cell utilizing the wireless protocol is to be added to a first hyper cell utilizing the wireless protocol, wherein the first hyper cell includes at least one transmit point associated with a first cell identifier (ID); and changing an association of the first transmit point from a second cell ID to the first cell ID, wherein at least one transmit point of the second hyper cell is associated with the second cell ID.]

[2. The method of claim 1, wherein the network conditions include load distribution, and wherein the method further comprises:

determining that a traffic load of a portion of the cellular network exceeds a predetermined threshold; and changing cell IDs of one or more transmit points transmitting to the portion of the cellular network.]

[3. The method of claim 1, wherein the network conditions include UE distribution across the network, and wherein the method further comprises:

determining that a concentration of user equipments (UEs) serviced by the cellular network at a boundary of the first hyper cell is above a predetermined threshold; and changing cell IDs of one or more transmit points to the cell ID of the first hyper cell, wherein the one or more transmit points transmit to the boundary of the first hyper cell.]

[4. The method of claim 1, further comprising:

determining that a second transmit point serves less than a threshold number of UEs; and turning off the second transmit point in response to determining that the second transmit point is serving less than the threshold number of UEs.]

[5. An apparatus for adapting hyper cells in response to changing conditions of a cellular network, the apparatus comprising:

at least one collector configured to collect data regarding network conditions of the cellular network, the cellular network configured to utilize a wireless protocol;

at least one processing unit configured to:

determine that a first transmit point associated with a second hyper cell utilizing the wireless protocol is to be added to a first hyper cell utilizing the wireless protocol in accordance with the collected data, wherein the first hyper cell includes at least one transmit point associated with a first cell identifier (ID); and change an association of the first transmit point from a second cell ID to the first cell ID, wherein at least one transmit point of the second hyper cell is associated with the second cell ID.]

[6. The apparatus of claim 5, wherein the network conditions include load distribution, and the at least one processing unit is configured to:

determine that a traffic load of a portion of the cellular network exceeds a predetermined threshold; and change cell IDs of one or more transmit points transmitting to the portion of the cellular network.]

[7. The apparatus of claim 5, wherein the network conditions include user equipment (UE) distribution across the network, and the at least one processing unit is configured to:

determine that a concentration of UEs serviced by the cellular network at a boundary of the first hyper cell is above a predetermined threshold; and change cell IDs of one or more transmit points to the cell ID of the first hyper cell, wherein the one or more transmit points transmit to the boundary of the first hyper cell.]

[8. The apparatus of claim 5, wherein the at least one processing unit is configured to:

determine that a second transmit point serves less than a threshold number of UEs; and turn off the second transmit point in response to determining that the second transmit point is serving less than the threshold number of UEs.]

[9. An apparatus for adapting hyper cells in response to changing conditions of a cellular network, the apparatus comprising:

at least one collector configured to collect data regarding network conditions of the cellular network;

at least one processing unit configured to:

determine that a transmit point is to be added to a first hyper cell in accordance with the collected data, wherein the first hyper cell includes at least one transmit point associated with a first cell identifier (ID); and change an association of the transmit point from a second cell ID to the first cell ID, wherein at least one transmit point of a second hyper cell is associated with the second cell ID, wherein the apparatus is a base station controlling one or more remote radio heads and wherein the base station is adapted to dynamically change one or more cell identifier (ID) in response to changing network conditions, wherein:

the base station is connected to each of the one or more remote radio heads via a communication line; and the one or more remote radio heads are adapted to receive and transmit radio frequency signals, and wherein the transmit point is a remote radio head.]

*10. A network system, comprising:*

*a base station associated with a first hyper cell and a second hyper cell, wherein the first hyper cell comprises a first plurality of base stations including the base station and sharing a first cell identifier (ID), and the second hyper cell comprises a second plurality of base stations including the base station and sharing a second cell ID,*

*the base station associated with the first hyper cell and the second hyper cell configured to:*

*transmit a first synchronization channel associated with the first hyper cell in the first hyper cell to a first user equipment (UE); and*

*transmit a second synchronization channel associated with the second hyper cell in the second hyper cell to a second UE, the first synchronization channel associated with the first hyper cell and the second synchronization channel associated with the second hyper cell being carried in a single frequency network by applying frequency division multiplexing (FDM).*

*11. The network system of claim 10, wherein the base station is located in an overlapped coverage area of the first hyper cell and the second hyper cell.*

*12. The network system of claim 10, wherein the base station is assigned to the first hyper cell and the second hyper cell at different times, frequencies, or spatial directions.*

*13. The network system of claim 10, wherein a resource of the base station is shared by the first hyper cell and the second hyper cell.*

*14. The network system of claim 10, wherein the first cell ID is unique to the first hyper cell, and the second cell ID is unique to the second hyper cell.*

*15. A method, comprising:*

*transmitting, by a base station in a network system, a first synchronization channel associated with a first hyper cell in the first hyper cell to a first user equipment (UE), the base station associated with the first hyper cell and a second hyper cell, wherein the first hyper cell comprises a first plurality of base stations including the base station and sharing a first cell identifier (ID), and the second hyper cell comprises a second plurality of base stations including the base station and sharing a second cell ID; and*

*transmitting, by the base station, a second synchronization channel associated with the second hyper cell in the second hyper cell to a second UE, the first synchronization channel associated with the first hyper cell and the second synchronization channel associated with the second hyper cell being carried in a single frequency network by applying frequency division multiplexing (FDM).*

*16. The method of claim 15, wherein the base station is located in an overlapped coverage area of the first hyper cell and the second hyper cell.*

*17. The method of claim 15, wherein the base station is assigned to the first hyper cell and the second hyper cell at different times, frequencies, or spatial directions.*

*18. The method of claim 15, wherein a resource of the base station is shared by the first hyper cell and the second hyper cell.*

*19. The method of claim 15, wherein the first cell ID is unique to the first hyper cell, and the second cell ID is unique to the second hyper cell.*

*20. A base station that is one of a first plurality of base stations of a first hyper cell and is one of a second plurality of base stations of a second hyper cell, the base station comprising:*

*at least one processor, wherein the at least one processor is configured to:*

*transmit a first synchronization channel associated with a the first hyper cell in the first hyper cell to a first user equipment (UE); and*

*transmit a second synchronization channel associated with the second hyper cell in the second hyper cell to a second UE, the first synchronization channel associated with the first hyper cell and the second synchronization channel associated with the second hyper cell being carried in a single frequency network by applying frequency division multiplexing (FDM),*

*wherein the base station shares a first cell identifier (ID) with other base stations of the first plurality of base stations, and wherein the base station shares a second cell ID with other base stations of the second plurality of base stations.*

*21. The base station of claim 20, wherein the base station is located in an overlapped coverage area of the first hyper cell and the second hyper cell.*

*22. The base station of claim 20, wherein the base station is assigned to the first hyper cell and the second hyper cell at different times, frequencies, or spatial directions.*

*23. The base station of claim 20, wherein a resource of the base station is shared by the first hyper cell and the second hyper cell.*

*24. The base station of claim 20, wherein the first cell ID is unique to the first hyper cell, and the second cell ID is unique to the second hyper cell.*

*25. A method, comprising:*

*receiving, by an apparatus from a base station in a network system, a first synchronization channel associated with a first hyper cell in the first hyper cell, the base station associated with the first hyper cell and a second hyper cell, wherein the first hyper cell comprises a first plurality of base stations including the base station and sharing a first cell identifier (ID), and the second hyper cell comprises a second plurality of base stations including the base station and sharing a second cell ID; and*

*receiving, by the apparatus from the base station, a second synchronization channel associated with the second hyper cell in the second hyper cell, the first synchronization channel associated with the first hyper cell and the second synchronization channel associated with the second hyper cell being carried in a single frequency network by applying frequency division multiplexing (FDM).*

*26. The method of claim 25, wherein the base station is located in an overlapped coverage area of the first hyper cell and the second hyper cell.*

*27. The method of claim 25, wherein the base station is assigned to the first hyper cell and the second hyper cell at different times, frequencies, or spatial directions.*

*28. The method of claim 25, wherein a resource of the base station is shared by the first hyper cell and the second hyper cell.*

*29. The method of claim 25, wherein the first cell ID is unique to the first hyper cell, and the second cell ID is unique to the second hyper cell.*

*30. An apparatus that is in a first hyper cell including a first plurality of base stations and in a second hyper cell including a second plurality of base stations, the apparatus comprising:*

*at least one processor, wherein the at least one processor is configured to:*

*receive, from a base station in a network system, a first synchronization channel associated with the first hyper cell in the first hyper cell; and*

*receive, from the base station, a second synchronization channel associated with the second hyper cell in the second hyper cell, the first synchronization channel associated with the first hyper cell and the second synchronization channel associated with the second hyper cell being carried in a single frequency network by applying frequency division multiplexing (FDM),*

*wherein the first plurality of base stations includes the base station, wherein the second plurality of base stations includes the base station, wherein the base station shares a first cell identifier (ID) with other base stations of the first plurality of base stations, and wherein the base station shares a second cell ID with other base stations of the second plurality of base stations.*

*31. The apparatus of claim 30, wherein the base station is located in an overlapped coverage area of the first hyper cell and the second hyper cell.*

*32. The apparatus of claim 30, wherein the base station is assigned to the first hyper cell and the second hyper cell at different times, frequencies, or spatial directions.*

*33. The apparatus of claim 30, wherein a resource of the base station is shared by the first hyper cell and the second hyper cell.*

*34. The apparatus of claim 30, wherein the first cell ID is unique to the first hyper cell, and the second cell ID is unique to the second hyper cell.*

* * * * *